United States Patent
Nishida (10) Patent No.: US 8,294,433 B2
(45) Date of Patent: Oct. 23, 2012

(54) CONSTANT CURRENT SUPPLY TYPE OF SWITCHING REGULATOR

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 373 days.

(21) Appl. No.: 12/665,983

(22) PCT Filed: Sep. 4, 2008

(86) PCT No.: PCT/JP2008/066372
§ 371 (c)(1),
(2), (4) Date: Dec. 22, 2009

(87) PCT Pub. No.: WO2009/035013
PCT Pub. Date: Mar. 19, 2009

(65) Prior Publication Data
US 2010/0327831 A1    Dec. 30, 2010

(30) Foreign Application Priority Data
Sep. 12, 2007 (JP) .................................. 2007-236576

(51) Int. Cl.
*G05F 1/613* (2006.01)
(52) U.S. Cl. ........................................ 323/224; 323/283
(58) Field of Classification Search .................. 323/224, 323/283, 284, 290
See application file for complete search history.

(56) References Cited

U.S. PATENT DOCUMENTS
6,603,671 B2 * 8/2003 Tokunaga et al. ............... 363/17
2003/0141857 A1 7/2003 Nishida et al.

FOREIGN PATENT DOCUMENTS
| JP | 60-207291 | 10/1985 |
| JP | 2003-204631 | 7/2003 |
| JP | 2003-230270 | 8/2003 |
| JP | 2007-4995 | 1/2007 |
| JP | 2007-25725 | 2/2007 |
| JP | 2007-28897 | 2/2007 |

* cited by examiner

*Primary Examiner* — Shawn Riley
(74) *Attorney, Agent, or Firm* — Cooper & Dunham LLP (57) ABSTRACT

A disclosed constant current supply type switching regulator includes a switching element configured to activate a switch operation depending on an input control signal, an inductor configured to be charged with the input voltage in response to the switching element activating the switch operation, a rectification element configured to discharge the inductor in response to the switching element shifting to a cutoff state, a current detection circuit unit configured to generate a current proportional to a current flowing into the switching element and generate and supply a current sense voltage depending on the proportional current and a control circuit unit configured to average the current sense voltage supplied from the current detection circuit unit and perform PWM (Pulse Width Modulation) control on the switching element for supplying a constant current in order to force the averaged voltage to be equal to a first reference voltage. The control circuit unit compares the averaged voltage with the first reference voltage and uses a pulse signal indicative of the comparison to perform the PWM control for supplying the constant current.

15 Claims, 10 Drawing Sheets

CONSTANT CURRENT SUPPLY TYPE OF SWITCHING REGULATOR

TECHNICAL FIELD

The present invention relates to a constant current supply type switching regulator for generating and supplying a constant current.

BACKGROUND ART

Figure 1:
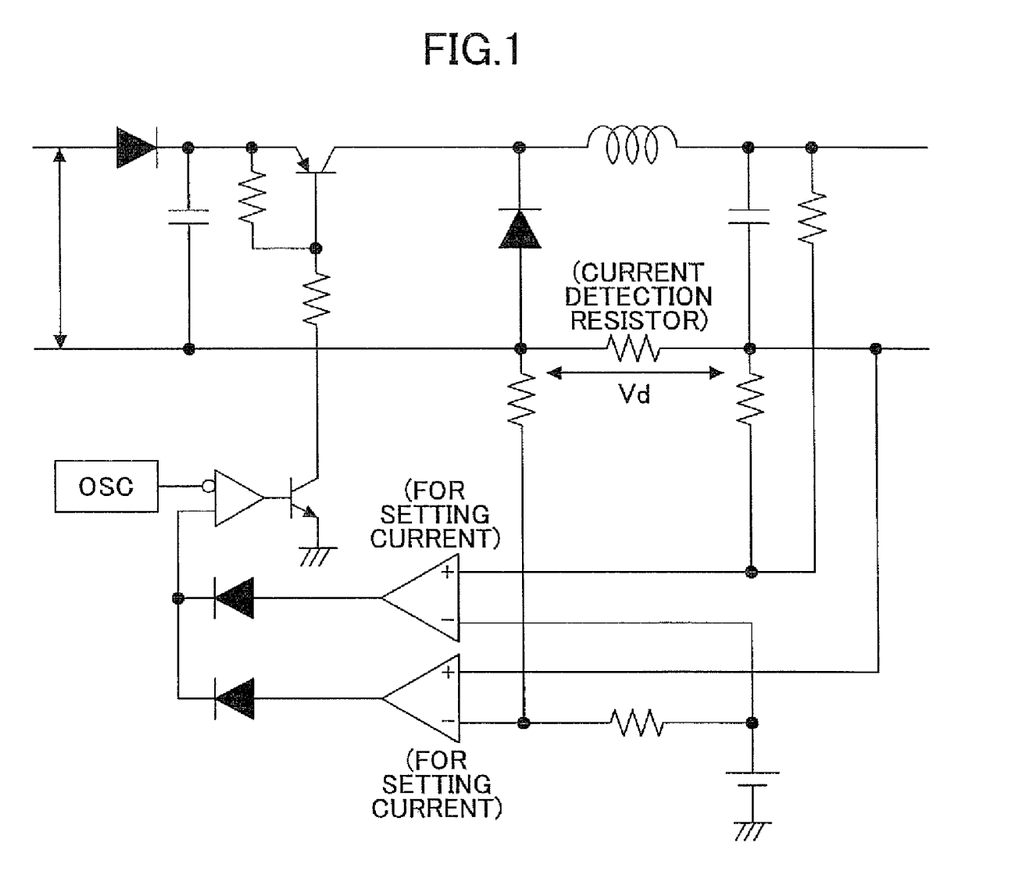
FIG. 1 is an exemplary circuit diagram illustrating a circuit of a conventional switching regulator.

FIG. 1 is a circuit diagram illustrating an exemplary circuit for a conventional switching regulator as described in Japanese Patent Application JP 2007-004995, for example. In FIG. 1, the switching regulator includes a voltage control operational amplifier and a current control operational amplifier, and the output current is detected based on a voltage difference Vd caused by a current flowing in a current detection resistor for generation of a constant current.

In conventional switching regulators, resistors are used to detect output currents, which may cause loss due to currents flowing in the resistors. Then, if resistances of the resistors are set to be smaller for reduction in the loss, higher-precision operational amplifiers must be used in the switching regulators.

DISCLOSURE OF THE INVENTION

The present invention addresses the above-mentioned problems. One object of the present invention is provide a constant current supply type switching regulator for converting an input voltage into a desired output current without the use of any current detecting resistor, which may reduce the number of elements in the switching regulator and alleviate loss otherwise caused by an incoming current to the resistor.

One feature of the present invention relates to a constant current supply type switching regulator for generating a predefined constant current from an input voltage supplied to an input terminal and supplying the generated current from an output terminal, comprising a switching element configured to activate a switch operation depending on an input control signal; an inductor configured to be charged with the input voltage in response to the switching element activating the switch operation; a rectification element configured to discharge the inductor in response to the switching element shifting to a cutoff state; a current detection circuit unit configured to generate a current proportional to a current flowing into the switching element and generate and supply a current sense voltage depending on the proportional current; and a control circuit unit configured to average the current sense voltage supplied from the current detection circuit unit and perform PWM (Pulse Width Modulation) control on the switching element for supplying a constant current in order to force the averaged voltage to be equal to a first reference voltage, wherein the control circuit unit compares the averaged voltage with the first reference voltage and uses a pulse signal indicative of the comparison to perform the PWM control for supplying the constant current.

Further, one feature of the present invention relates to a constant current supply type switching regulator for generating a predefined constant current from an input voltage supplied to an input terminal and supplying the generated current from an output terminal, comprising a switching element configured to activate a switch operation depending on an input control signal; an inductor configured to be charged with the input voltage in response to the switching element activating the switch operation; a rectification element configured to discharge the inductor in response to the switching element shifting to a cutoff state; a current detection circuit unit configured to generate a current proportional to a current flowing into the switching element and generate and supply a current sense voltage depending on the proportional current; and a control circuit unit configured to perform PWM (Pulse Width Modulation) control on the switching element for supplying a constant current in order to force the current sense voltage supplied from the current detection circuit unit to be equal to a second reference voltage, wherein the control circuit unit generates the second reference voltage through addition of a voltage difference between a first reference voltage and the current sense voltage to the first reference voltage, compares the current sense voltage with the second reference voltage, and uses a pulse signal indicative of the comparison to perform the PWM control for supplying a constant current.

Still further, one feature of the present invention relates to a constant current supply type switching regulator for generating a predefined constant current from an input voltage supplied to an input terminal and supplying the generated current from an output terminal, comprising a switching element configured to activate a switch operation depending on an input control signal; an inductor configured to be charged with the input voltage in response to the switching element activating the switch operation; a rectification element configured to discharge the inductor in response to the switching element shifting to a cutoff state; a current detection circuit unit configured to generate a current proportional to a current flowing into the switching element and generate and supply a current sense voltage depending on the proportional current; and a control circuit unit configured to compare the current sense voltage with a predefined first reference voltage and control the switch operation of the switching element depending on the comparison, wherein the control circuit unit switches the switching element OFF to determine whether an inductor current flowing into the inductor reaches zero and/or switches the switching element ON to perform VFM (Variable Frequency Modulation) control on the switching element for supplying a constant current.

Still further, one feature of the present invention relates to a constant current supply type switching regulator for generating a predefined constant current from an input voltage supplied to an input terminal and supplying the generated current from an output terminal, comprising a switching element configured to activate a switch operation depending on an input control signal; an inductor configured to be charged with the input voltage in response to the switching element activating the switch operation; a rectification element configured to discharge the inductor in response to the switching element shifting to a cutoff state; a current detection circuit unit configured to generate a current proportional to a current flowing into the switching element and generate and supply a current sense voltage depending on the proportional current; and a control circuit unit configured to perform PWM (pulse Width Modulation) control or VFM (Variable Frequency Modulation) control on the switching element for supplying a constant current depending on a predefined first reference voltage, wherein if the first reference voltage is lower than a predefined third reference voltage, the control circuit unit generates a second reference voltage through addition of a voltage difference between the first reference voltage and the current sense voltage to the first reference voltage, compares the current sense voltage with the second reference voltage, and uses a pulse signal indicative of the comparison to perform the PWM control on the switching element for supplying a constant current, and if the first reference voltage is higher than or equal to the third reference voltage, the control circuit unit compares the current sense voltage with the first reference voltage and controls the switch operation of the switching element depending on the comparison, the control circuit unit switching the switching element OFF to determine whether an inductor current flowing into the inductor reaches zero and/or switching the switching element ON to perform the VFM control on the switching element for supplying a constant current.

According to the features of the present invention, a constant current supply type switching regulator can convert an input voltage into a desired output current without the use of any current detecting resistor, which may reduce the number of elements in the switching regulator and alleviate loss otherwise caused by an incoming current to the resistor.

BEST MODE FOR CARRYING OUT THE INVENTION

Embodiments of the present invention will be described with reference to the accompanying drawings in detail below.

First Embodiment

Figure 2:
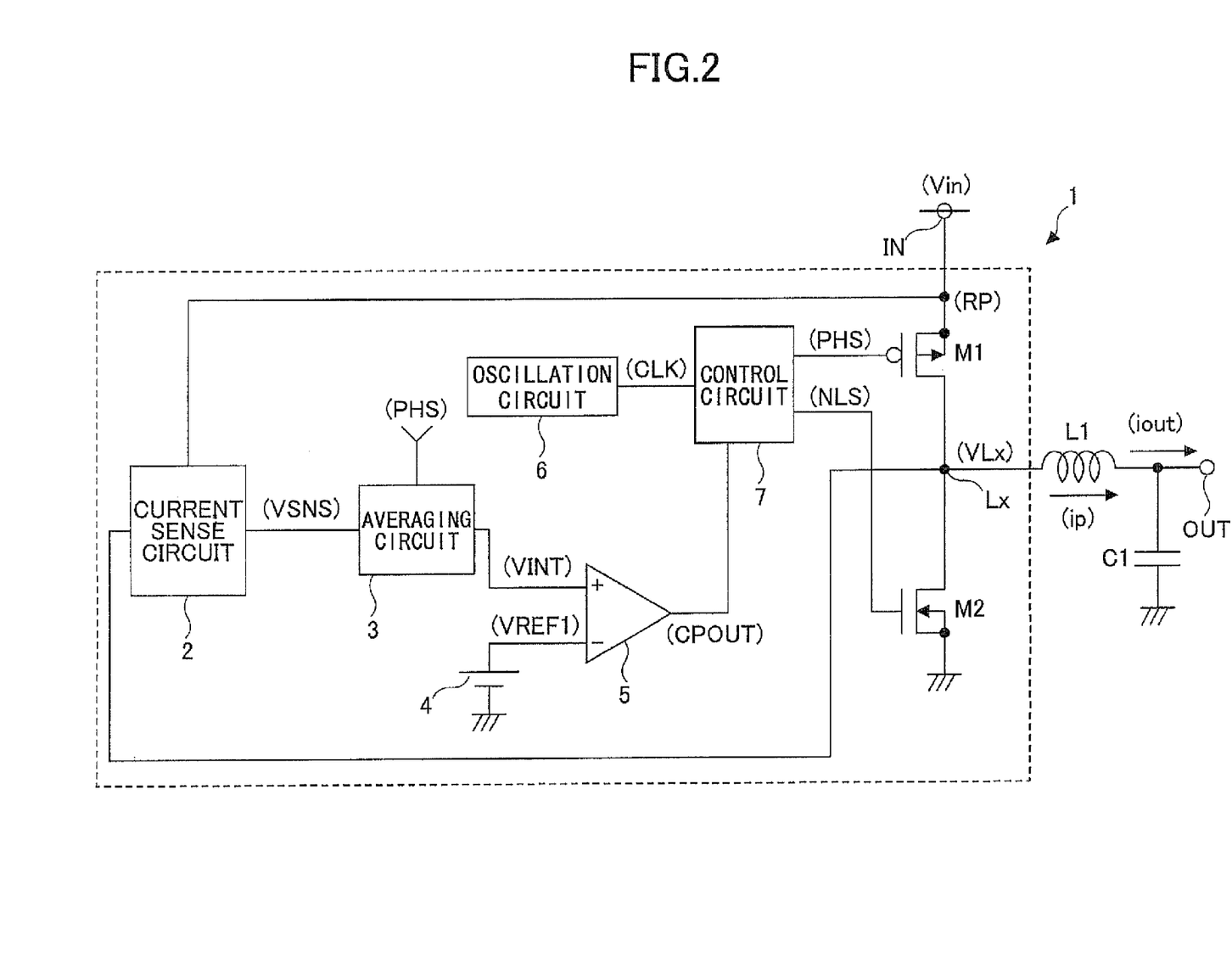
FIG. 2 shows an exemplary circuit configuration of a constant current supply type of switching regulator according to a first embodiment of the present invention.

FIG. 2 shows an exemplary circuit configuration of a constant current supply type of switching regulator according to the first embodiment.

In FIG. 2, the constant current supply type of switching regulator (simply referred to as "switching regulator" hereinafter) 1 may be a non-isolated type of switching regulator with an inductor for generating a predefined constant current iout from an incoming voltage Vin to an input terminal IN and supplying the generated current to an output terminal OUT.

The switching regulator 1 includes a switching transistor M1 composed of a PMOS transistor for switching to control an input voltage Vin and a synchronous rectification transistor M2 composed of an NMOS transistor. The switching regulator 1 further includes a current sense circuit 2 for detecting an output current iout, an averaging circuit 3, a reference voltage generation circuit 4 for generating and supplying a predefined first reference voltage VREF1, a comparator 5, an oscillation circuit 6 for generating and supplying a predefined clock signal CLK, a control circuit 7 for controlling switching operations of the switching transistor M1 and the synchronous rectification transistor M2, an inductor L1 and a capacitor C1.

In this embodiment, the switching transistor M1 and the synchronous rectification transistor M2 constitute a switching element and a rectification element, respectively. Also, the current sense circuit 2 constitutes a current detection circuit unit. Then, the averaging circuit 3, the reference voltage generation circuit 4, the comparator 5, the oscillation circuit 6 and the control circuit 7 together constitute a control circuit unit. In the switching regulator 1 in FIG. 2, individual circuits other than the inductor L1 and the capacitor C1 may be integrated into a single IC. Alternatively, individual circuits other than the switching transistor M1 and/or the synchronous rectification transistor M2, the inductor L1 and the capacitor C1 may be integrated into a single IC.

The switching transistor M1 is serially coupled to the synchronous rectification transistor M2 between the input terminal IN and ground voltage. A connection unit Lx is provided between the switching transistor M1 and the synchronous rectification transistor M2. Also, the inductor L1 is provided between the connection unit Lx and the output terminal OUT while the capacitor C1 is provided between the output terminal OUT and ground voltage. In the current sense circuit 2, the input voltage Vin and a voltage VLx of the connection unit Lx are supplied to the inputs thereof, and a current sense voltage VSNS is supplied from the output thereof to the averaging circuit 3. An output voltage VINT of the averaging circuit 3 is supplied to a non-inverted input terminal of the comparator 5. Also, a first reference voltage VREF1 is supplied to an inverted input terminal of the comparator 5, and an output signal CPOUT of the comparator 5 is supplied to the control circuit 7. In addition, a clock signal CLK is supplied to the control circuit 7, which in turn generates a control signal PHS to supply to a gate of the switching transistor M1 and the averaging circuit 3 and generates a control signal NLS to supply to a gate of the synchronous rectification transistor M2.

In this configuration, the current sense circuit 2 detects a current flowing while the switching transistor M1 is ON, converts the detected current into a voltage and generates a current sense voltage VSNS. The averaging circuit 3 averages the current sense voltage VSNS supplied from the current sense circuit 2 and generates an output voltage VINT. The comparator 5 compares the output voltage VINT supplied from the averaging circuit 3 with the first reference voltage VREF1 and if the output voltage VINT is higher than or equal to the first reference voltage VREF1, generates a high-level signal CPOUT. The control circuit 7 uses the clock signal CLK to perform PWM (Pulse Width Modulation) on the signal CPOUT for generating and supplying the control signals PHS and NLS.

Figure 3:
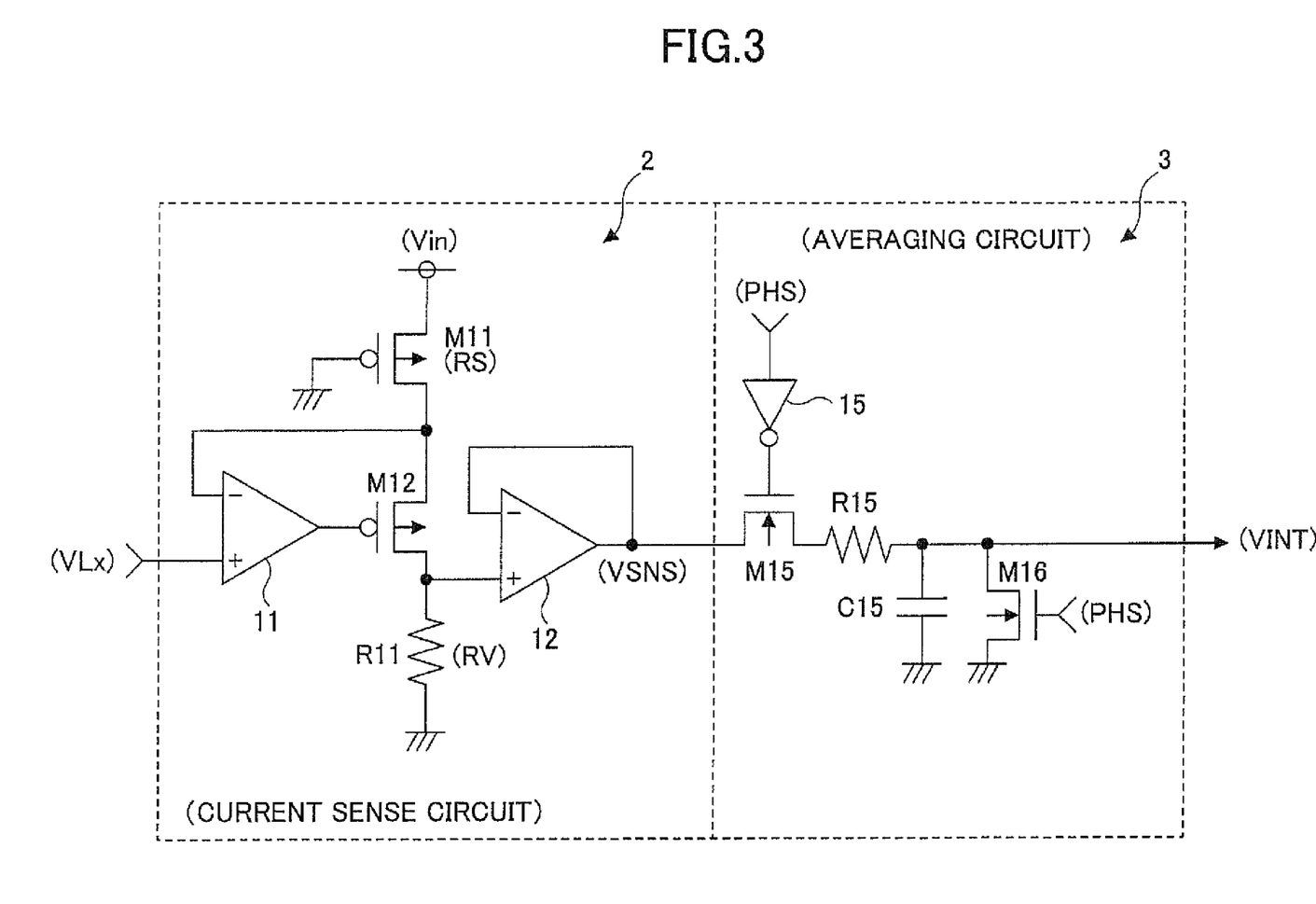
FIG. 3 shows an exemplary circuit configuration of a current sense circuit and an averaging circuit.

FIG. 3 shows an exemplary circuit configuration of the current sense circuit 2 and the averaging circuit 3.

In FIG. 3, the current sense circuit 2 includes operational amplifiers 11, 12, PMOS transistors M11, M12 and a resistor R11. The averaging circuit 3 includes an inverter 15, NMOS transistors M15, M16, a capacitor C15 and a resistor R15.

In the current sense circuit 2, the PMOS transistor M11 is provided between an input voltage Vin and a source of the PMOS transistor M12, and a gate of the PMOS transistor M11 is coupled to ground voltage. As a result, the PMOS transistor M11 may constitute a constant current source.

The resistor R11 is provided between a drain of the PMOS transistor M12 and ground voltage, and a connection unit between the PMOS transistor M12 and the resistor R11 is coupled to a non-inverted input terminal of the operational amplifier 12. On the other hand, a connection unit between the PMOS transistors M11 and M12 is coupled to an inverted input terminal of the operational amplifier 11. A voltage VLx is supplied to the non-inverted input terminal of the operational amplifier 11, and an output terminal of the operational amplifier 11 is coupled to a gate of the PMOS transistor M12. In the operational amplifier 12, the output terminal thereof is coupled to the inverted input terminal to constitute a voltage follower, and a current sense voltage VSNS is supplied from the output terminal of the operational amplifier 12.

In the averaging circuit 3, the current sense voltage VSNS is supplied to a source of the NMOS transistor M15, and a drain of the NMOS transistor M15 is coupled to one end of the resistor R15. A control signal PHS is supplied to an input terminal of the inverter 15, and an output terminal of the inverter 15 is coupled to a gate of the NMOS transistor M15. The capacitor C15 and the NMOS transistor M16 are provided in parallel between the other end of the resistor R15 and ground voltage, and an output voltage VINT is supplied from connection units between the resistor R15 and the capacitor C15 and the NMOS transistor M16. A control signal PHS is supplied to a gate of the NMOS transistor M16.

The operational amplifier 11 controls operations of the PMOS transistor M12 such that a voltage of the connection unit between the PMOS transistors M11 and M12 is equal to a voltage VLx. Thus, a current proportional to an output current of the switching transistor M1 is supplied from the PMOS transistor M11. The proportional current is converted into a voltage in the resistor R11, and impedance conversion is further performed on the voltage in the operational amplifier 12 to generate the current sense voltage VSNS. In this manner, the current flowing toward the switching transistor M1 can be converted into the voltage VLx. Supposing that an ON resistance of the switching transistor M1 is RP, an ON resistance of the PMOS transistor M11 is RS, a resistance of the resistor R11 is RV and an inductor current flowing in the inductor L1 is ip, the current sense voltage VSNS can be expressed by the formula (1) as presented below;

$$VSNS = ip \times RP/RS \times RV \qquad (1).$$

In the averaging circuit 3, the current sense voltage VSNS is integrated by the resistor R15 and the capacitor C15 only when the NMOS transistor M15 is ON, that is, only when the switching transistor M1 is ON. A time constant of that integration is set by the resistor R15 and the capacitor C15.

Figure 4:
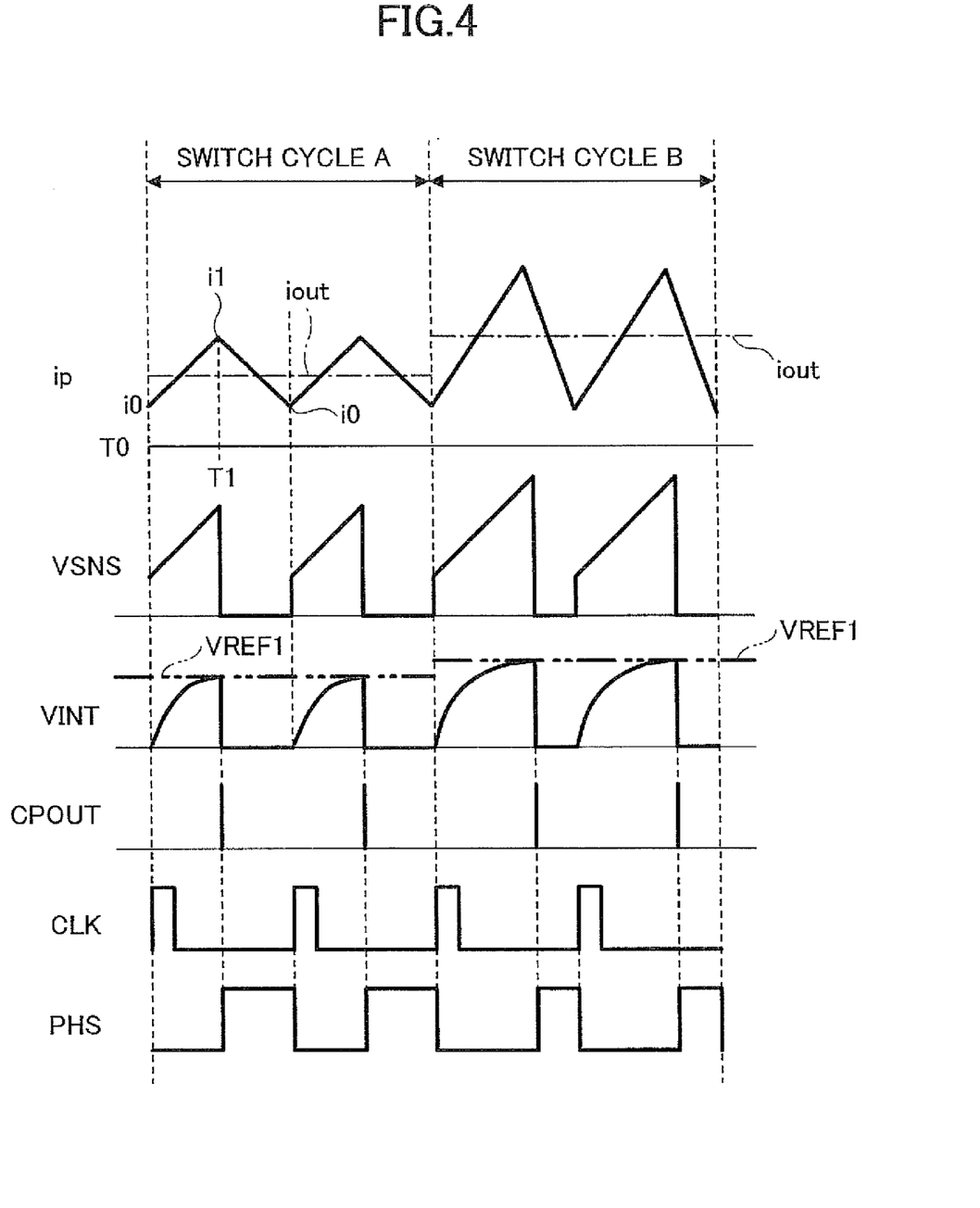
FIG. 4 is a timing chart of signal waveforms for individual elements in the switching regulator illustrated in FIGS. 2 and 3.

FIG. 4 is a timing chart of signal waveforms for individual elements in the switching regulator 1 illustrated in FIGS. 2 and 3. An exemplary operation of the switching regulator 1 is described with reference to FIG. 4 in detail below.

In FIG. 4, respective switch cycles A and B correspond to different constant current levels.

Under stationary conditions, an initial level i0 of the inductor current ip is the same in both the switch cycles A and B. Also, since the output current iout is equal to an average current over a single switch cycle, the output current iout will be equal to an average of the initial current level i0 and the peak current level i1 of the inductor current ip while the switching transistor M1 is ON. In other words, the output current iout will be equal to a value obtained from the addition of the initial current level i0 to half a difference between the initial current level i0 and the peak current level i1 as follows;

$$iout = i0 + (i1 - i0)/2 \qquad (2).$$

Also, supposing that time points of the inductor current ip being equal to i0 and i1 are denoted by T0 and T1, respectively, the output current iout, which may be an average of the initial current level i0 and the peak current level i1, can be expressed as follows;

$$iout = \int ip(t)dt \qquad (3),$$

where the integral interval of formula (3) is from T0 to T1 (also referred to as (T1−T0)).

Thus, the averaging circuit 3 generates and supplies an output voltage VINT being the average output level by integrating the current sense voltage VSNS obtained through voltage conversion of the inductor current ip only during the time interval (T1−T0). Note that the resistance of the resistor R15 and the capacity of the capacitor C15, which may compose the time constant of the integrator, are set under consideration of the switching frequency, that is, the frequency of the clock signal CLK.

Also, supposing that a predefined constant current level is denoted by iset, and the reference voltage generation circuit 4 generates and supplies the first reference voltage VREF1 such that the output current iout is equal to the predefined level iset. In other words, the first reference voltage VREF1 can be computed in accordance with a formula derived from formulae (1) and (3);

$$VREF1 = \int VSNS(t)dt = iset \times RP/RS \times RV - \alpha \qquad (4),$$

where α is set through correction based on the inductor value and/or others to satisfy formula (3).

In this manner, the switching regulator according to the first embodiment can control the respective operations of the switching transistor M1 and the synchronous rectification transistor M2 during the PWM control based on the clock signal CLK supplied from the oscillation circuit 6 being used as a frame reference for the PWM control and the signal CPOUT being indicative of a result of the voltage comparison between the output voltage VINT of the averaging circuit 3 and the first reference voltage VREF1. As a result, no current detection resistor is required, thereby reducing components for use in the switching regulator 1 and alleviating loss otherwise caused by the current flowing in the resistor.

Second Embodiment

In the first embodiment, the output current iout depends on the clock signal CLK in that frequency variations of the clock signal CLK lead to variations of the voltage VINT. In the second embodiment, a switching regulator is configured to make the output current independent of the clock signal CLK.

Figure 5:
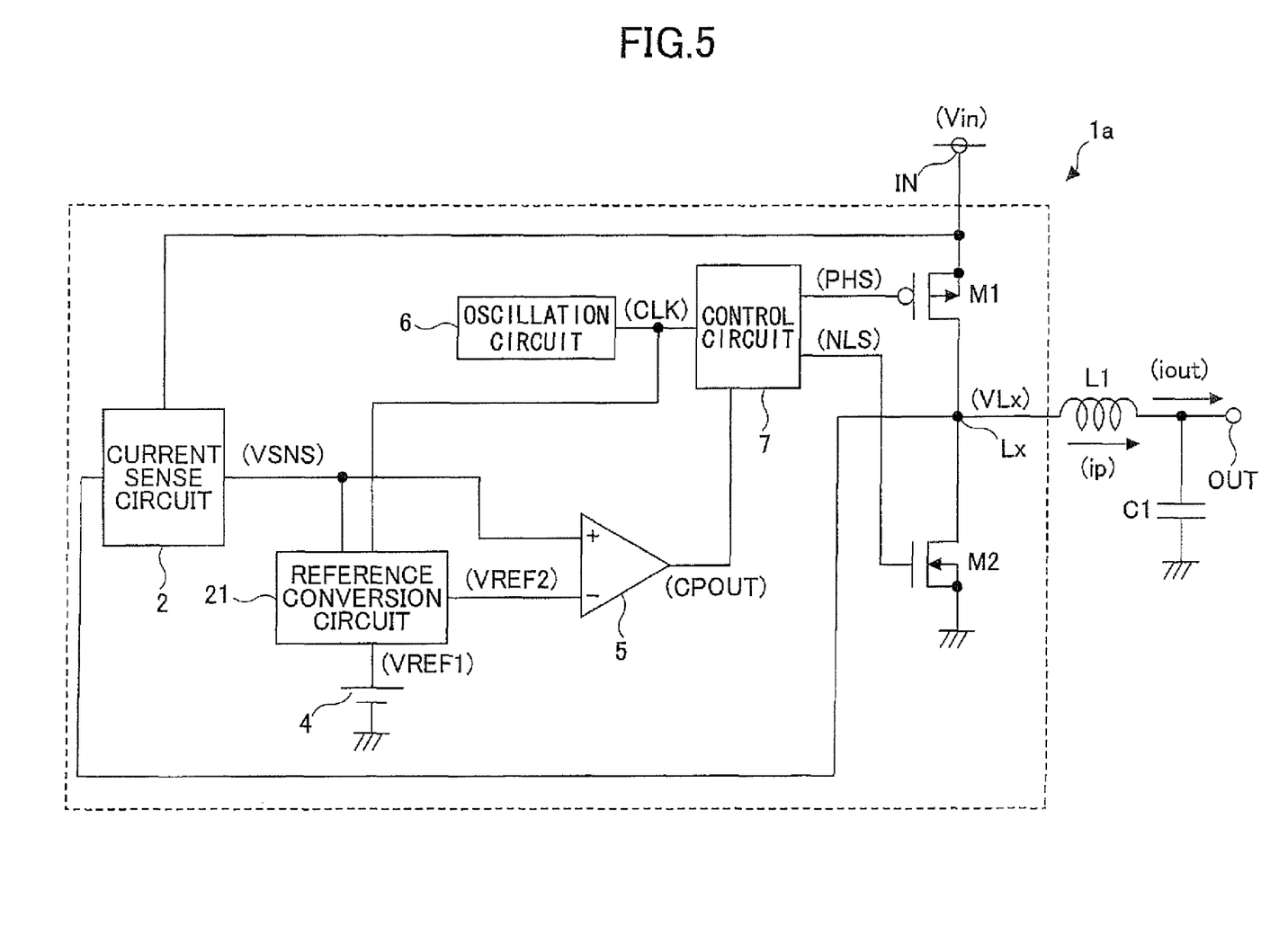
FIG. 5 shows an exemplary circuit configuration of a constant current supply type of switching regulator according to a second embodiment of the present invention.

FIG. 5 shows an exemplary circuit configuration of a constant current supply type of switching regulator according to the second embodiment of the present invention. In FIG. 5, the same or similar elements as/to ones illustrated in FIG. 2 are designated by the same or similar reference numerals. Then, descriptions thereof are omitted and only differences between them are described below.

A switching regulator 1a in FIG. 5 differs from the switching regulator in FIG. 2 in that the switching regulator 1a does not include the averaging circuit 3 as illustrated in FIG. 2 but includes a reference conversion circuit 21 for converting the first reference voltage VREF1 to generate a second reference voltage VREF2.

In FIG. 5, the switching regulator 1a is a non-isolated type switching regulator with an inductor for generating a predefined constant current iout from an input voltage Vin supplied to an input terminal IN and supplying the generated current iout to an output terminal OUT.

The switching regulator 1a includes a switching transistor M1, a synchronous rectification transistor M2, a current sense circuit 2, a reference voltage generation circuit 4, a reference conversion circuit 21, a comparator 5, an oscillation circuit 6, a control circuit 7, an inductor L1 and a capacitor C1.

A current sense voltage VSNS is supplied from the current sense circuit 2 to a non-inverted input terminal of the comparator 5 and the reference conversion circuit 21. Then, a first reference voltage VREF1 and a clock signal CLK are supplied to the reference conversion circuit 21. A second reference voltage VREF2 generated in the reference conversion circuit 21 is supplied to an inverted input terminal of the comparator 5.

In this embodiment, the reference voltage generation circuit 4, the comparator 5, the oscillation circuit 6, the control circuit 7 and the reference conversion circuit 21 constitute a control circuit unit. In the switching regulator 1a in FIG. 5, individual circuits other than the inductor L1 and the capacitor C1 may be integrated into a single IC. Alternatively, individual circuits other than the switching transistor M1 and/or the synchronous rectification transistor M2, the inductor L1 and the capacitor C1 may be integrated into a single IC.

Figure 6:
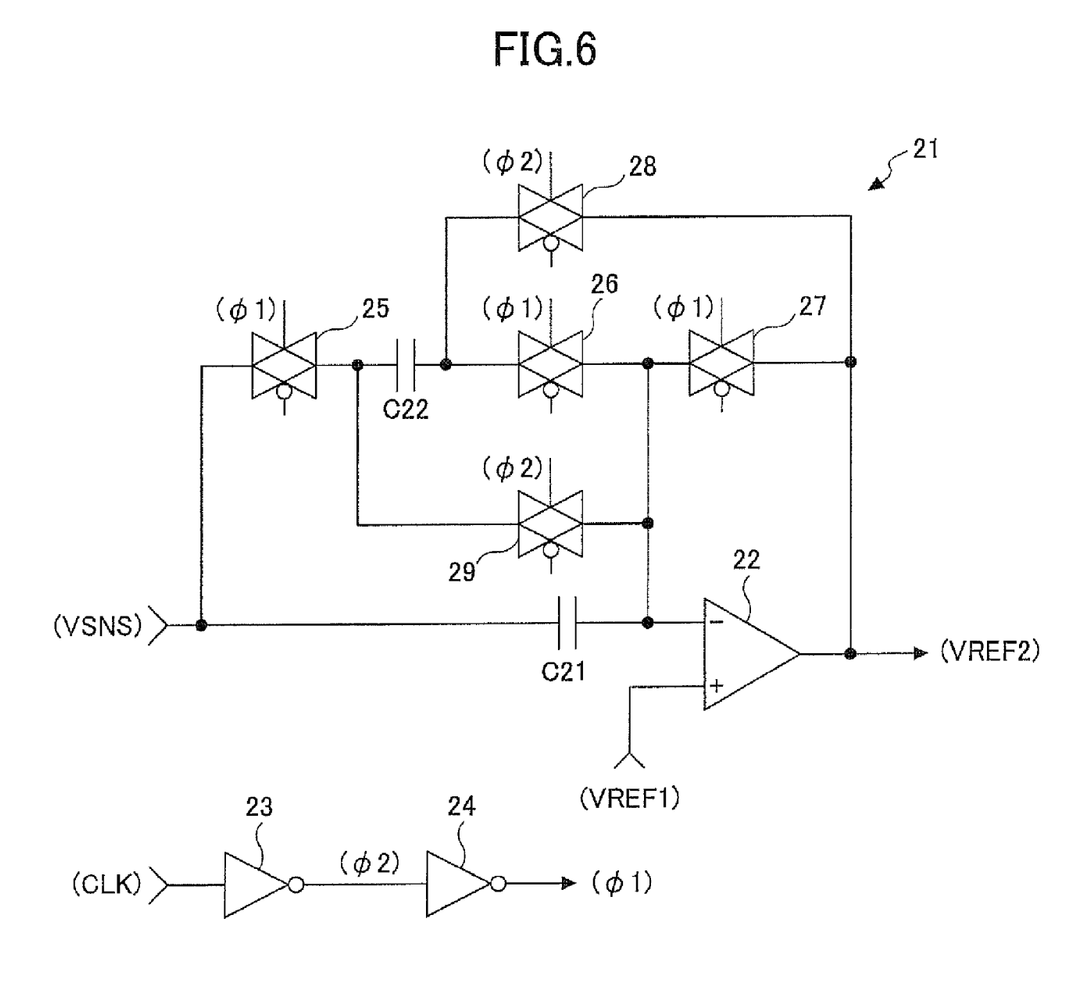
FIG. 6 shows an exemplary configuration of a reference conversion circuit illustrated in FIG. 5.

FIG. 6 shows an exemplary circuit configuration of the reference conversion circuit 21 in FIG. 5.

In FIG. 6, the reference conversion circuit 21 includes an operational amplifier 22, inverters 23, 24, analog switches 25-29 and capacitors C21, C22 with the same capacitance and constituting a switched capacitor circuit.

A first reference voltage VREF1 is supplied to a non-inverted input terminal of the operational amplifier 22, and the capacitor C21 is provided between the current sense voltage VSNS and an inverted input terminal of the operational amplifier 22. The analog switch 25 is provided between one end of the capacitor C22 and the current sense voltage VSNS, and the analog switch 29 is provided between a connection unit between the capacitor C22 and the analog switch 25 and an inverted input terminal of the operational amplifier 22.

The serially coupled analog switches 26, 27 are coupled parallel to the analog switch 28 between the other end of the capacitor C22 and an output terminal of the operational amplifier 22, and a connection unit between the analog switches 26 and 27 is coupled to the inverted input terminal of the operational amplifier 22. The second reference voltage VREF2 is supplied from an output terminal of the operational amplifier 22. The inverter 23 generates and supplies an inverted clock signal $\phi 2$ by inverting the signal level of the clock signal CLK. The inverter 24 generates and supplies a clock signal $\phi 1$ by further inverting the signal level of the inverted clock signal $\phi 2$. The analog switches 25-27 activate respective switch operations depending on the clock signal $\phi 1$. Specifically, when the clock signal $\phi 1$ is in high level, the analog switches 25-27 become ON and switch into the conducting state. On the other hand, when the clock signal $\phi 1$ is in low level, the analog switches 25-27 become OFF and switch into the cutoff state. Also, the analog switches 28, 29 activate respective switch operations depending on the inverted clock signal $\phi 2$. Specifically, when the inverted clock signal $\phi 2$ is in high level, the analog switches 28, 29 become ON and switch into the conducting state. On the other hand, when the inverted clock signal $\phi 2$ is in low level, the analog switches 28, 29 become OFF and switch into the cutoff state.

In the reference conversion circuit 21, when the clock signal $\phi 1$ is in high level, the current sense voltage VSNS is sampled at flow time of a current with an initial current level i0 flowing to the switching transistor M1, and when the inverted clock signal $\phi 2$ is in high level, the second reference voltage VREF2 is generated through addition of a voltage difference $\Delta$VS between the first reference voltage VREF1 and the sampled current sense voltage VSNS to the first reference voltage VREF1. In other words, the second reference voltage VREF2 can be expressed by the formula (5) as follows;

$$VREF2 = VREF1 + \Delta VS \quad (5).$$

Figure 7:
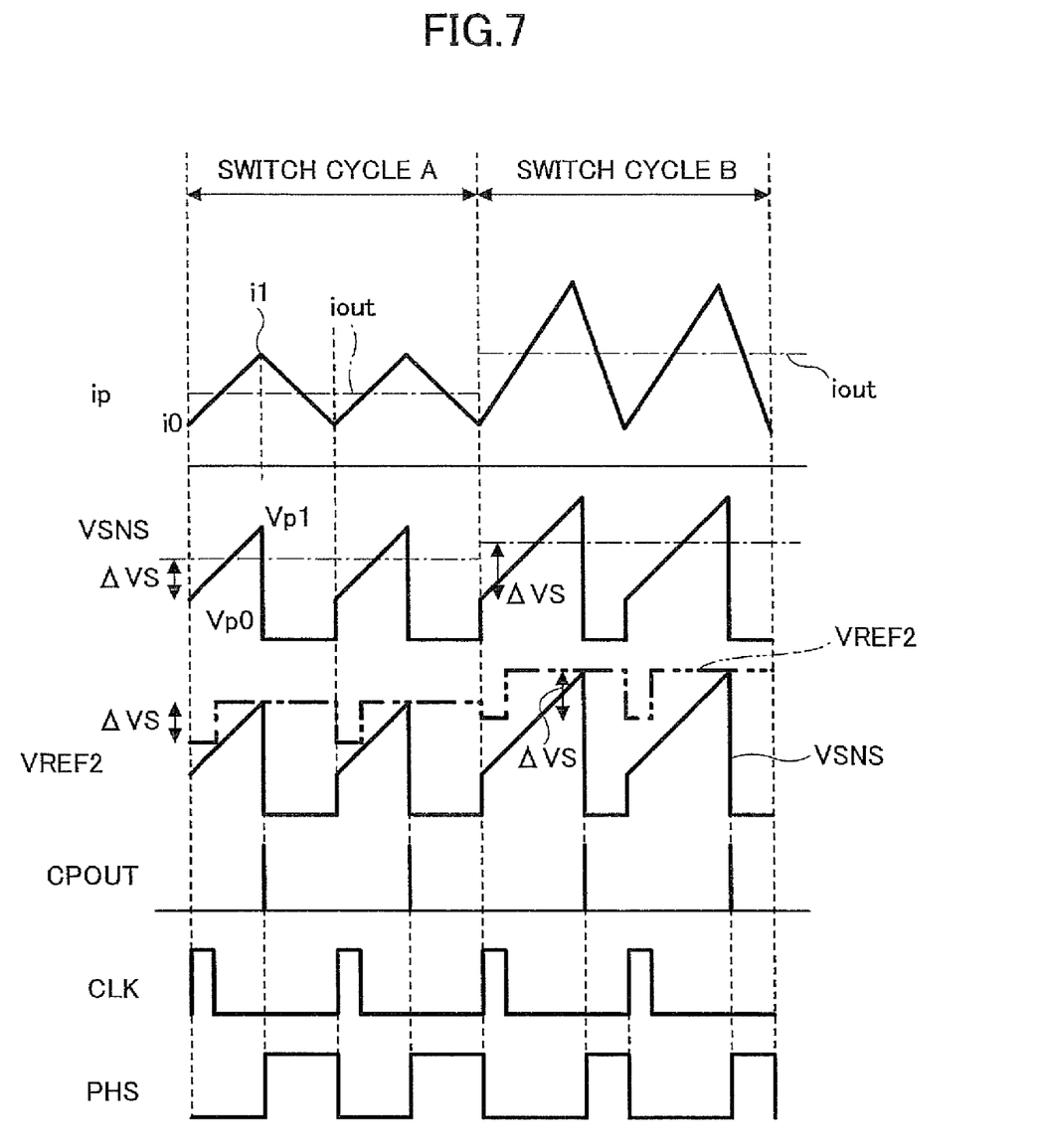
FIG. 7 is a timing chart of signal waveforms for individual elements in the switching regulator illustrated in FIGS. 5 and 6.

FIG. 7 is a timing chart of signal waveforms of individual elements in the switching regulator 1a illustrated in FIGS. 5 and 6. An exemplary operation of the switching regulator 1a is described with reference to FIG. 7 in detail below.

Under stationary conditions, the output current iout is equal to a level obtained from addition of half a difference between the initial level i0 and a peak level i1 to the initial level i0 as expressed by formula (2).

Supposing in the current sense circuit 2 that a voltage obtained from voltage conversion of the initial level i0 is Vp0 and a voltage obtained from voltage conversion of the peak level i1 is Vp1, the formulae (6)-(8) can be derived in consideration of the formula (2) as follows;

$$Vp0 = i0 \times RP/RS \times RV \quad (6),$$

$$Vp1 = 2 \times Vout - Vp0 \quad (7), \text{ and}$$

$$Vout = iout \times RP/RS \times RV \quad (8),$$

where Vout is the voltage of the output terminal OUT.

It is supposed that the first reference voltage VREF1 is set to satisfy formula (9) as presented below so that the output current iout can be equal to a predefined constant current level iset;

$$VREF1 = iset \times RP/RS \times RV \quad (9).$$

Since the predefined constant current level iset is equal to the output current level iout, the voltage Vp1 can be expressed by formula (10) as presented below from the formulae (7)-(9);

$$Vp1 = 2 \times iset \times RP/RS \times RV \times Vp0 \quad (10).$$

The second reference voltage generated from the reference conversion circuit 21 can be expressed by formula (11) as presented below from the formula (5);

$$VREF2 = VREF1 + (VREF1 - Vp0) \quad (11)$$
$$= 2 \times VREF1 - Vp0$$
$$= 2 \times iset \times RP/RS \times RV - Vp0.$$

In this manner, the second reference voltage VREF2 can be made equivalent to the voltage Vp1.

Since the comparator 5 compares the converted second reference voltage VREF2 with the current sense voltage VSNS to generate the signal CPOUT, the following relations can hold;

$$VSNS = VREF2 = Vp1, \text{ and}$$

$$ip = i1,$$

which means that the signal CPOUT generated from the comparator 5 controls a time period for the inductor current level ip reaching the current level i1. Thus, constant current PWM control over the predefined level iset can be achieved.

In this manner, according to the switching regulator 1a of the second embodiment, when the clock signal CLK is in high level, the current sense voltage VSNS is sampled at the flow time of the current with the initial current level i0 flowing to the switching transistor M1, and on the other hand, when the clock signal CLK is in low level, the second reference voltage VREF2 is generated through addition of the voltage difference AVS between the first reference voltage VREF1 and the sampled current sense voltage VSNS to the first reference voltage VREF1, and then the second reference voltage VREF2 is compared with the current sense voltage VSNS of the current sense circuit 2 to generate the signal CPOUT. Based on the signals, the respective operations of the switching transistor M1 and the synchronous rectification transistor M2 can be controlled during PWM control. As a result, not only the same effect as the first embodiment can be achieved but also the output current iout can be made independent of the clock signal CLK, thereby obtaining a more stable output current iout.

Third Embodiment

In the first and second embodiments, PWM control is performed on the switching transistor M1 and the synchronous rectification transistor M2. However, VFM (Variable Frequency Modulation) control may be performed on the switching transistor M1 and the synchronous rectification transistor M2, and a switching regulator according to the third embodiment of the present invention utilizes the VFM control.

Figure 8:
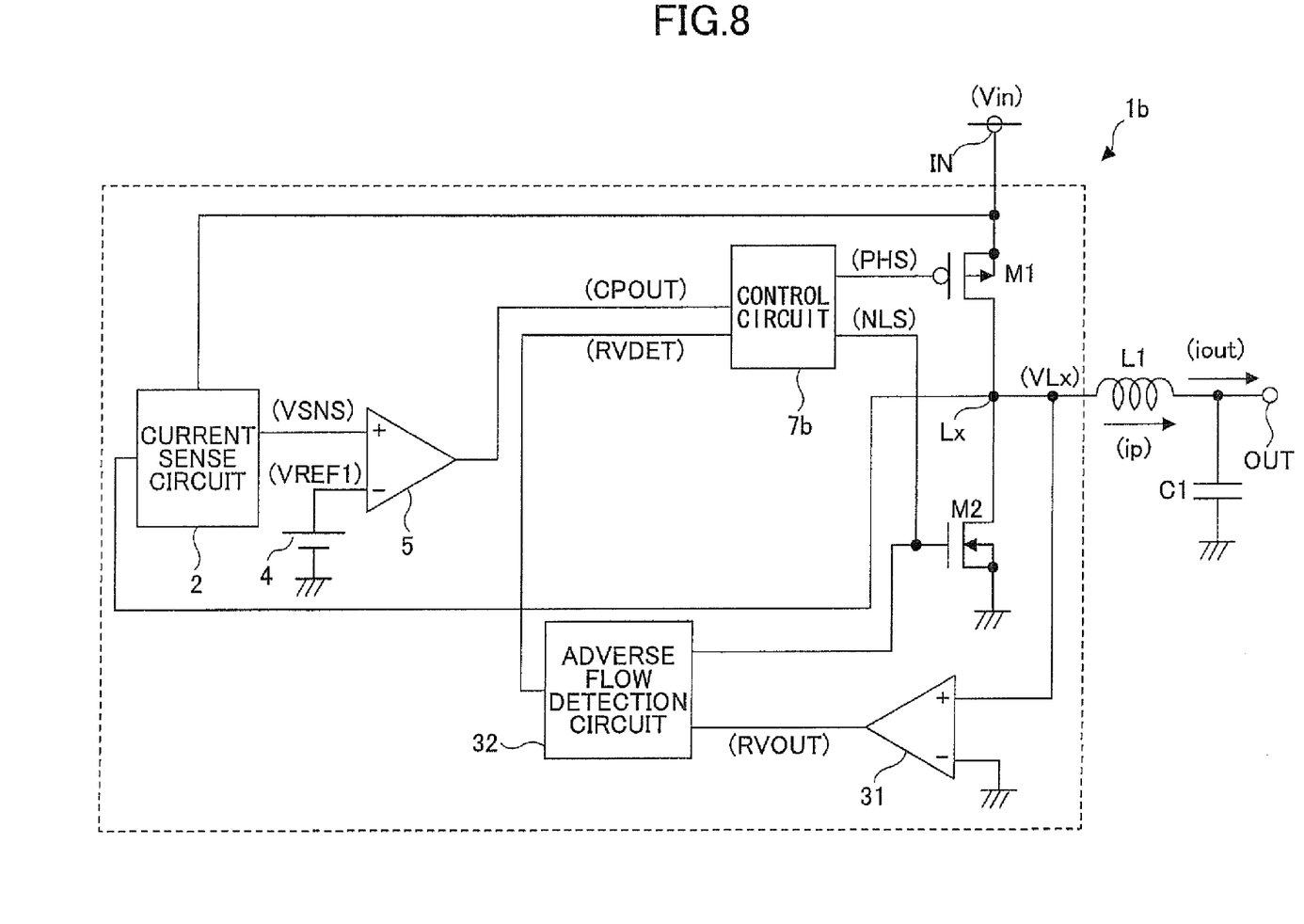
FIG. 8 shows an exemplary circuit configuration of a constant current supply type of switching regulator according to a third embodiment of the present invention.

FIG. 8 shows an exemplary circuit configuration of a constant current supply type switching regulator according to the third embodiment of the present invention. In FIG. 8, the same or similar elements as/to ones illustrated in FIG. 2 are designated by the same or similar reference numerals. Then, descriptions thereof are omitted and only differences between them are described below.

A switching regulator 1b in FIG. 8 differs from the switching regulator 1 illustrated in FIG. 2 in that the switching regulator 1b does not include the averaging circuit 3 and the oscillation circuit 6 illustrated in FIG. 2 but does include a comparator 31 for detecting some indications that a current flowing toward an inductor L1 may be reversed and an adverse flow detection circuit 32 for detecting occurrence of the adverse flow based on the detection of the comparator 31. In association with this alteration, instead of the control circuit 7 and the switching regulator 1,
a control circuit 7b and the switching regulator 1b are used in FIG. 8.

In FIG. 8, the switching regulator 1b is a non-isolated type switching regulator with an inductor for generating a predefined constant current iout from an input voltage Vin supplied to an input terminal IN and supplying the generated current iout to an output terminal OUT.

The switching regulator 1b includes a switching transistor M1, a synchronous rectification transistor M2, a current sense circuit 2, a reference voltage generation circuit 4, comparators 5, 31, the control circuit 7b, the adverse flow detection circuit 32, the inductor L1 and a capacitor C1.

In this embodiment, the reference voltage generation circuit 4, the comparators 5, 31, the control circuit 7b and the adverse flow detection circuit 32 constitute a control circuit unit. Also, the comparator 5 constitutes a first voltage comparison circuit while the comparator 31 constitutes a second voltage comparison circuit. In the switching regulator 1b in FIG. 8, individual elements other than the inductor L1 and the capacitor C1 may be integrated into a single IC. Alternatively, individual elements other than the switching transistor M1 and/or the synchronous rectification transistor M2, the inductor L1 and the capacitor C1 may be integrated into a single IC.

A current sense voltage VSNS is supplied from the current sense circuit 2 to a non-inverted input terminal of the comparator 5, and a predefined first reference voltage VREF1 is supplied to an inverted input terminal of the comparator 5. In the comparator 31, an inverted input terminal thereof is coupled to ground voltage, and a voltage VLx is supplied to a non-inverted input terminal thereof. A signal RVOUT indicative of a voltage comparison of the comparator 31 is supplied to the adverse flow detection circuit 32. The adverse flow detection circuit 32 determines based on the output signal RVOUT of the comparator 31 and a control signal NLS whether the level of an inductor current ip is equal to zero. Based on the determination, the adverse flow detection circuit 32 generates a signal RVDET indicative of the determination and supplies the signal RVDET to the control circuit 7b. The control circuit 7b generates and supplies control signals PHS and NLS from the received signals CPOUT and RVDET.

Figure 9:
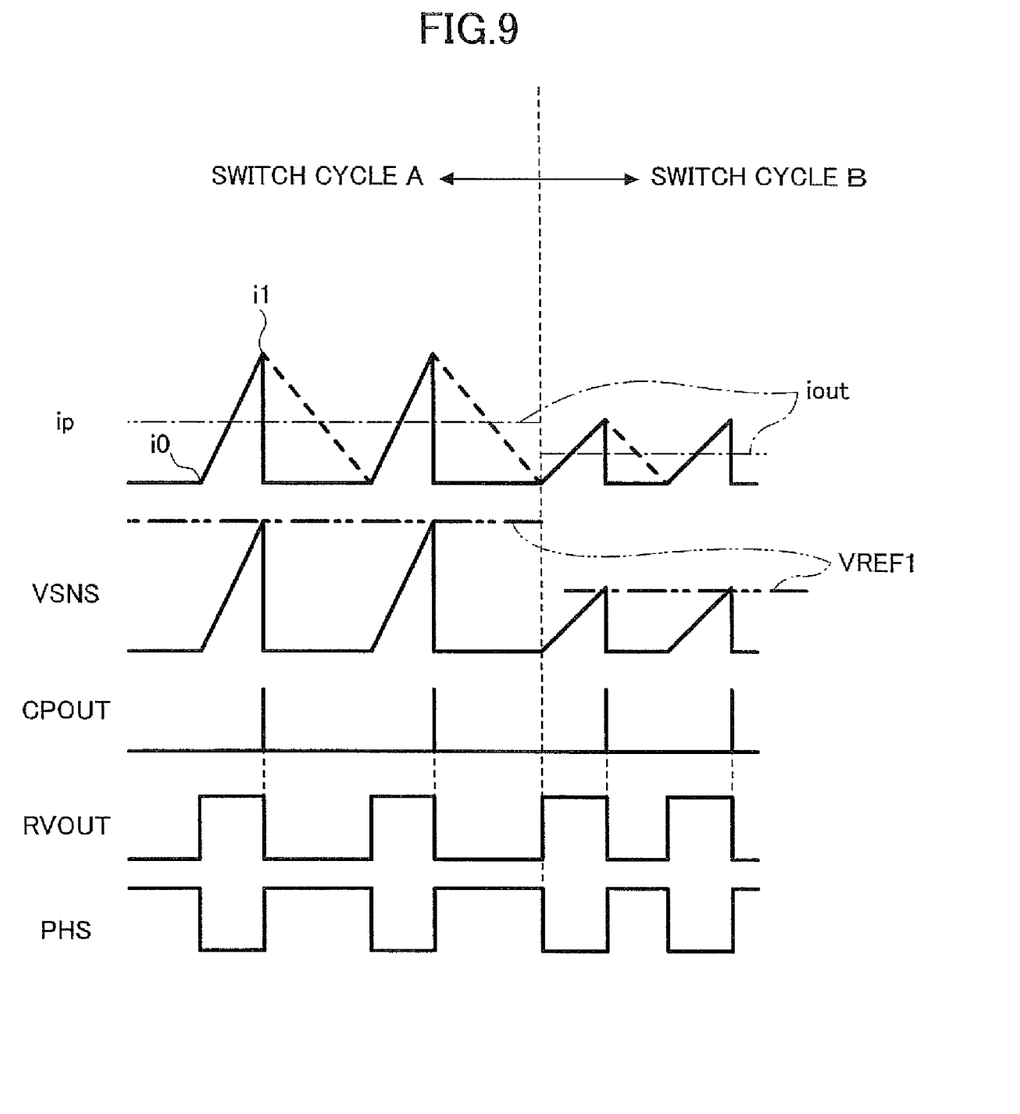
FIG. 9 is a timing chart of signal waveforms for individual elements in the switching regulator illustrated in FIG. 8.

FIG. 9 is a timing chart of signal waveforms for individual elements in the switching regulator 1b illustrated in FIG. 8. An exemplary operation of the switching regulator 1b is described with reference to FIG. 9 in detail below.

The switching regulator 1b controls an inductor current ip such that the level of the inductor current ip can be equal to zero for each cycle. Supposing that the level of the inductor current ip after a switch ON cycle is i1 and a predefined constant current level is iset, formula (12) can hold as follows;

$$i1/2 = iset \tag{12}$$

A first reference voltage VREF1 is set to satisfy the formula (13) as follows;

$$VREF1 = 2 \times iset \times RP/RS \times RV \tag{13},$$

which means that the first reference voltage VREF1 has a level twice as high as a constant current output level.

As observed from FIG. 9, when the signal CPOUT becomes high level, the control circuit 7b generates a control signal PHS with high level, and on the other hand, when the signal RVOUT becomes high level and the signal RVDET indicative of detection of a flow reversal indication is supplied from the adverse flow detection circuit 32, the control circuit 7b generates the control signal PHS with low level.

Since the comparator 5 is used to compare the current sense voltage VSNS with the first reference voltage VREF1, the current sense voltage VSNS becomes equal to the first reference voltage VREF1. Then, when a time period Ton passes since switching of the switching transistor M1 into ON, a peak level i1 of the inductor current ip will be equal to (2×iset). In other words, the time period Ton required to satisfy the formula (13) can be controlled, and thus the switching regulator 1b can perform the constant current VFM control.

In this manner, the switching regulator 1b of the third embodiment keeps the switch transistor M1 ON until the current sense voltage VSNS of the current sense circuit 2 reaches the predefined first reference voltage VREF1. Upon detecting that the inductor current ip reaches zero, the switching regulator 1b switches the switching transistor M1 into OFF to control the inductor current ip for supply of a constant current. As a result, the switching regulator 1b not only achieves the same effect as the first embodiment but also can perform the VFM control, thereby improving the efficiency for lower load currents.

Fourth Embodiment

The PWM control of the second embodiment and the VFM control of the third embodiment may be alternated with each other depending on the level of the first reference voltage VREF1. A switching regulator according to the fourth embodiment adopts this scheme.

Figure 10:
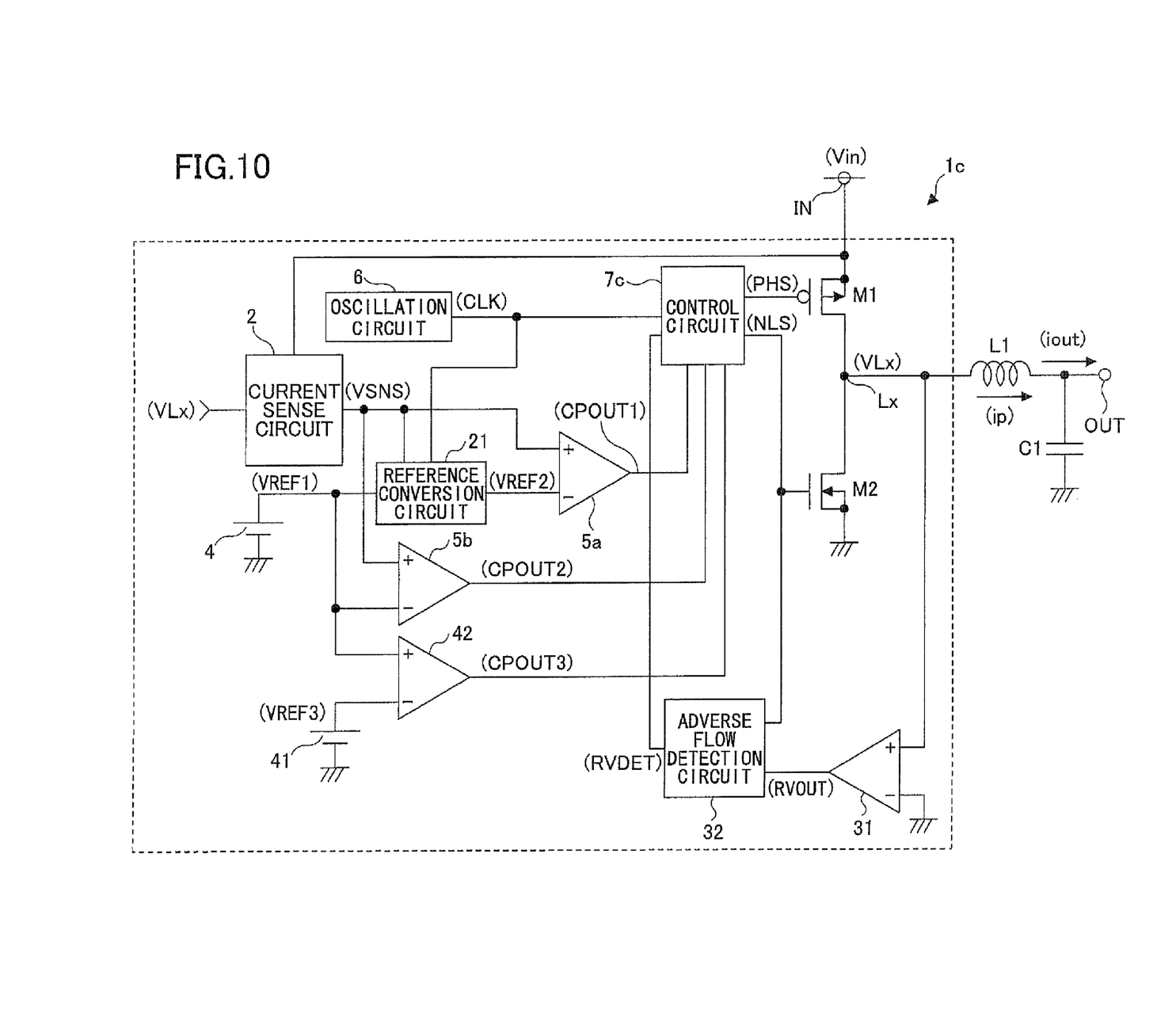
FIG. 10 shows an exemplary circuit configuration of a constant current supply type of switching regulator according to a fourth embodiment of the present invention.

FIG. 10 shows an exemplary circuit configuration of a constant current supply type switching regulator 1c according to the fourth embodiment.

In FIG. 10, the same or similar elements as/to ones illustrated in FIGS. 5 and 8 are designated by the same or similar reference numerals. Then, descriptions thereof are omitted, and only an exemplary case where the PWM control illustrated in FIG. 5 and the VFM control illustrated in FIG. 8 are switched with each other depending on the level of the first reference voltage VREF1 is focused on below.

In FIG. 10, the switching regulator 1c is a non-isolated type switching regulator with an inductor for generating a predefined constant current iout from an input voltage Vin supplied to an input terminal IN and supplying the generated current iout to an pnput terminal OUT.

The switching regulator 1c includes a switching transistor M1, a synchronous rectification transistor M2, a current sense circuit 2, a reference voltage generation circuit 4, comparators 5a, 5b, 31, 42, an oscillation circuit 6, a control circuit 7c, a reference conversion circuit 21, an adverse flow detection circuit 32, a reference voltage generation circuit 41 for generating and supplying a predefined third reference voltage VREF3, an inductor L1 and a capacitor C1. The comparators 5a and 5b of the present embodiment may correspond to the comparator 5 in FIG. 5 and the comparator 5 in FIG. 8, respectively.

In this embodiment, the reference voltage generation circuits 4, 41, the comparators 5a, 5b, 31, 42, the oscillation circuit 6, the control circuit 7c, the reference conversion circuit 21 and the adverse flow detection circuit 32 constitute a control circuit unit. Also, the comparators 5a, 5b, 31 and 42 constitute first, second, third and fourth voltage comparison circuits, respectively. In addition, individual elements other than the inductor L1 and the capacitor C1 in the switching regulator 1c may be integrated into a single IC. Alternatively, individual elements other than the switching transistor M1 and/or the synchronous rectification transistor M2, the inductor L1 and the capacitor C1 may be integrated into a single IC.

In the comparator 5a, a current sense voltage VSNS and a second reference voltage VREF2 are supplied to a non-inverted input terminal and an inverted input terminal, respectively, and an output signal CPOUT1 is supplied from an output terminal to the control circuit 7c. In the comparator 5b, the current sense voltage VSNS and a first reference voltage VREF1 are supplied to a non-inverted input terminal and an inverted input terminal, respectively, and an output signal CPOUT2 is supplied from an output terminal to the control circuit 7c. In the comparator 42, the first reference voltage VREF1 and a third reference voltage VREF3 are supplied to a non-inverted input terminal and an inverted input terminal, respectively, and an output signal CPOUT3 is supplied from an output terminal to the control circuit 7c.

If the first reference voltage VREF1 is higher than or equal to the third reference voltage VREF3, the comparator 42 generates the output signal CPOUT3 with high level, and on the other hand, if the first reference voltage VREF1 is lower than the third reference voltage VREF3, the comparator 42 generates the output signal CPOUT3 with low level. When the high level signal CPOUT3 is supplied to the control circuit 7c, the control circuit 7c uses the output signal CPOUT1 of the comparator 5a to perform the same PWM control as is the case of FIG. 5. On the other hand, when the low level signal CPOUT3 is supplied to the control circuit 7c, the control circuit 7c uses the output signal CPOUT2 of the comparator 5b and the output signal RVDET of the adverse flow detection circuit 32 to perform the same VFM control as is the case of FIG. 8.

In this manner, the switching regulator 1c of the fourth embodiment may be configured to switch between the PWM control of the second embodiment and the VFM control of the third embodiment depending on the level of the first reference voltage VREF1. According to this embodiment, the switching regulator 1c not only achieves the same effect as the second and third embodiments but also can have a wider settable constant current range.

In the above descriptions for the first through the fourth embodiments, step-down type switching regulators have been used. However, the present invention is not limited to this type of switching regulators and can be applied to step-up type switching regulators. In this case, the inductor L1 is serially coupled to the switching transistor M1 composed of a NMOS transistor between the input voltage Vin and the ground voltage, and the synchronous rectification transistor M2 composed of a PMOS transistor is provided between a connection unit between the inductor L1 and the switching transistor M1 and the output terminal OUT. A control signal NLS is supplied to a gate of the switching transistor M1, and a control signal PHS is supplied to a gate of the synchronous rectification transistor M2. In addition, in the cases of FIGS. 8 and 10, the output voltage Vout is supplied to an inverted input terminal of the comparator 31.

Also, in the above descriptions, synchronous rectification type switching regulators have been used. However, the present invention is not limited to this type of switching regulators and can be applied to asynchronous rectification type switching regulators. In this case, the synchronous rectification transistor M2 may be replaced with a diode. In particular, in step-down type switching regulators, a cathode of the diode is coupled to the connection unit Lx while an anode of the diode is coupled to ground voltage. On the other hand, in step-up type switching regulators, the cathode of the diode is coupled to the output terminal OUT while the anode of the diode is coupled to the connection unit Lx.

The present invention is not limited to the specifically disclosed embodiments, and variations and modifications may be made without departing from the scope of the present invention.

The present application is based on Japanese Priority Patent Application No. 2007-236576 filed on Sep. 12, 2007, the entire contents of which are hereby incorporated herein by reference.

The invention claimed is:

1. A constant current supply type switching regulator for generating a predefined constant current from an input voltage supplied to an input terminal and supplying the generated current from an output terminal, comprising:
   a switching element configured to activate a switch operation depending on an input control signal;
   an inductor configured to be charged with the input voltage in response to the switching element activating the switch operation;
   a rectification element configured to discharge the inductor in response to the switching element shifting to a cutoff state;
   a current detection circuit unit configured to generate a current proportional to a current flowing into the switching element from a voltage at a connection unit connecting the switching element with the rectification element and generate and supply a current sense voltage depending on the proportional current; and
   a control circuit unit configured to average the current sense voltage supplied from the current detection circuit unit and perform PWM (Pulse Width Modulation) control on the switching element for supplying a constant current in order to force the averaged voltage to be equal to a first reference voltage, wherein the control circuit unit integrates and averages the current sense voltage while the switching element is in a conducting state, compares the averaged voltage with the first reference voltage and uses a pulse signal indicative of the comparison to perform the PWM control for supplying the constant current.

2. The switching regulator as claimed in claim 1, wherein the current detection circuit unit generates the proportional current by controlling a current supplied from a constant current source such that a voltage at an output terminal of the constant current source is equal to the voltage at the connection unit.

3. The switching regulator as claimed in claim 1, wherein the control circuit unit comprises:
   an averaging circuit configured to generate and supply the averaged voltage by integrating the current sense voltage while the switching element is in the conducting state;
   a voltage comparison circuit configured to compare the averaged voltage with the first reference voltage and generate and supply the pulse signal indicative of the comparison; and
   a control circuit configured to use a predefined clock signal to perform the PWM on the pulse signal supplied from the voltage comparison circuit and use a PMW pulse signal obtained by the PWM to cause the switching element to activate the switch operation.

4. A constant current supply type switching regulator for generating a predefined constant current from an input voltage supplied to an input terminal and supplying the generated current from an output terminal, comprising:
   a switching element configured to activate a switch operation depending on an input control signal;
   an inductor configured to be charged with the input voltage in response to the switching element activating the switch operation;
   a rectification element configured to discharge the inductor in response to the switching element shifting to a cutoff state;
   a current detection circuit unit configured to generate a current proportional to a current flowing into the switching element and generate and supply a current sense voltage depending on the proportional current; and
   a control circuit unit configured to perform PWM (Pulse Width Modulation) control on the switching element for supplying a constant current in order to force the current sense voltage supplied from the current detection circuit unit to be equal to a second reference voltage,
   wherein the control circuit unit generates the second reference voltage through addition of a voltage difference between a first reference voltage and the current sense voltage to the first reference voltage, compares the current sense voltage with the second reference voltage, and uses a pulse signal indicative of the comparison to perform the PWM control for supplying a constant current.

5. The switching regulator as claimed in claim 4, wherein the control circuit unit comprises:
   a reference conversion circuit configured to generate the second reference voltage through addition of a voltage difference between the first reference voltage and the current sense voltage to the first reference voltage;
   a voltage comparison circuit configured to compare the current sense voltage with the second reference voltage supplied from the reference conversion circuit and generate a pulse signal indicative of the comparison; and
   a control circuit configured to use a predefined clock signal to perform the PWM control on the pulse signal supplied from the voltage comparison circuit for supplying a constant current and use a PMW pulse signal obtained by the PWM to cause the switching element to activate the switch operation.

6. The switching regulator as claimed in claim 5, wherein the reference conversion circuit comprises a switched capacitor circuit.

7. A constant current supply type switching regulator for generating a predefined constant current from an input voltage supplied to an input terminal and supplying the generated current from an output terminal, comprising:
   a switching element configured to activate a switch operation depending on an input control signal;
   an inductor configured to be charged with the input voltage in response to the switching element activating the switch operation;
   a rectification element configured to discharge the inductor in response to the switching element shifting to a cutoff state;
   a current detection circuit unit configured to generate a current proportional to a current flowing into the switching element and generate and supply a current sense voltage depending on the proportional current; and
   a control circuit unit configured to compare the current sense voltage with a predefined first reference voltage and control the switch operation of the switching element depending on the comparison,
   wherein the control circuit unit switches the switching element OFF to determine whether an inductor current flowing into the inductor reaches zero and/or switches the switching element ON to perform VFM (Variable Frequency Modulation) control on the switching element for supplying a constant current.

8. The switching regulator as claimed in claim 7, wherein the control circuit unit switches the switching element OFF in response to the current sense voltage being higher than or equal to the first reference voltage and switches the switching element ON in response to a determination that the inductor current reaches zero based on a voltage at a connection unit between the switching element and the inductor.

9. The switching regulator as claimed in claim 8, wherein the first reference voltage is set to be equal to a voltage level of the current sense voltage corresponding to a current level twice as high as the output current supplied from the output terminal reaching the predefined constant current.

10. The switching regulator as claimed in claim 8, wherein the control circuit unit comprises:
   a first voltage comparison circuit configured to compare the current sense voltage with the first reference voltage and generate and supply a signal indicative of the comparison;
   a second voltage comparison circuit configured to compare a voltage at a connection unit between the switching element and the inductor with a ground voltage and generate and supply a signal indicative of the comparison; and
   a control circuit configured to cause the switching element to activate the switch operation based on respective output signals of the first voltage comparison circuit and the second voltage comparison circuit.

11. The switching regulator as claimed in claim 7, wherein the first reference voltage is set to be equal to a voltage level of the current sense voltage corresponding to a current level twice as high as the output current supplied from the output terminal reaching the predefined constant current.

12. A constant current supply type switching regulator for generating a predefined constant current from an input voltage supplied to an input terminal and supplying the generated current from an output terminal, comprising:
   a switching element configured to activate a switch operation depending on an input control signal;
   an inductor configured to be charged with the input voltage in response to the switching element activating the switch operation;
   a rectification element configured to discharge the inductor in response to the switching element shifting to a cutoff state;
   a current detection circuit unit configured to generate a current proportional to a current flowing into the switching element and generate and supply a current sense voltage depending on the proportional current; and
   a control circuit unit configured to perform PWM (pulse Width Modulation) control or VFM (Variable Frequency Modulation) control on the switching element for supplying a constant current depending on a predefined first reference voltage,
   wherein if the first reference voltage is lower than a predefined third reference voltage, the control circuit unit generates a second reference voltage through addition of a voltage difference between the first reference voltage and the current sense voltage to the first reference voltage, compares the current sense voltage with the second reference voltage, and uses a pulse signal indicative of the comparison to perform the PWM control on the switching element for supplying a constant current, and if the first reference voltage is higher than or equal to the third reference voltage, the control circuit unit compares the current sense voltage with the first reference voltage and controls the switch operation of the switching element depending on the comparison, the control circuit unit switching the switching element OFF to determine whether an inductor current flowing into the inductor reaches zero and/or switching the switching element ON to perform the VFM control on the switching element for supplying a constant current.

13. The switching regulator as claimed in claim 12, wherein if the control circuit unit performs the VFM control for supplying a constant current, the control circuit unit switches the switching element OFF in response to the current sense voltage being higher than or equal to the first reference voltage and switches the switching element ON in response to a determination that the inductor current reaches zero based on a voltage at a connection unit between the switching element and the inductor.

14. The switching regulator as claimed in claim 12, wherein the control circuit unit comprises:
   a reference conversion circuit configured to generate the second reference voltage through addition of a voltage difference between the first reference voltage and the current sense voltage to the first reference voltage;
   a first voltage comparison circuit configured to compare the second reference voltage supplied from the reference conversion circuit with the current sense voltage and generate and supply a signal indicative of the comparison;
   a second voltage comparison circuit configured to compare the current sense voltage with the first reference voltage and generate and supply a signal indicative of the comparison;
   a third voltage comparison circuit configured to compare a voltage at a connection unit between the switching element and the inductor with a ground voltage and generate and supply a signal indicative of the comparison;
   a fourth voltage comparison circuit configured to compare the first reference voltage with the third reference voltage and generate and supply a signal indicative of the comparison; and
   a control circuit configured to perform the PWM control depending on an output signal of the first voltage comparison circuit or the VFM control depending on respective output signals of the second voltage comparison circuit and the third voltage comparison circuit based on the output signal of the fourth voltage comparison circuit.

15. The switching regulator as claimed in claim 14, wherein the reference conversion circuit comprises a switched capacitor circuit.

* * * * *